US011920751B1

(12) United States Patent
Lu et al.

(10) Patent No.: US 11,920,751 B1
(45) Date of Patent: Mar. 5, 2024

(54) TRI-PROOF LAMP WITH REPLACEABLE SENSOR END CAP

(71) Applicant: Xiamen PVTECH Co., Ltd., Fujian (CN)

(72) Inventors: Fuxing Lu, Fujian (CN); Weibiao Zhong, Fujian (CN)

(73) Assignee: Xiamen PVTECH Co., Ltd., Fujian (CN)

(*) Notice: Subject to any disclaimer, the term of this patent is extended or adjusted under 35 U.S.C. 154(b) by 0 days.

(21) Appl. No.: 18/113,593

(22) Filed: Feb. 23, 2023

(30) Foreign Application Priority Data

Sep. 15, 2022 (CN) ......................... 202211123698.7

(51) Int. Cl.

| | |
|---|---|
| ***F21S 4/28*** | (2016.01) |
| ***F21V 23/04*** | (2006.01) |
| ***F21V 23/06*** | (2006.01) |
| ***F21Y 103/10*** | (2016.01) |
| ***F21Y 115/10*** | (2016.01) |

(52) U.S. Cl.
CPC ............ *F21S 4/28* (2016.01); *F21V 23/0442* (2013.01); *F21V 23/06* (2013.01); *F21Y 2103/10* (2016.08); *F21Y 2115/10* (2016.08)

(58) Field of Classification Search
CPC ........ F21S 4/28; F21V 23/0442; F21V 23/06; F21Y 2103/10; F21Y 2115/10
See application file for complete search history.

(56) References Cited

U.S. PATENT DOCUMENTS

| | | | | |
|---|---|---|---|---|
| 9,574,717 | B2 * | 2/2017 | Scapa | F21K 9/278 |
| 9,625,128 | B2 * | 4/2017 | Lu | F21V 25/12 |
| 10,222,052 | B1 * | 3/2019 | Ter-Hovhannisyan | F21S 8/043 |
| 2008/0290814 | A1 * | 11/2008 | Leong | H05B 45/357 315/294 |
| 2010/0103673 | A1 * | 4/2010 | Ivey | F21K 9/272 156/60 |
| 2012/0306377 | A1 * | 12/2012 | Igaki | F21V 23/0464 315/154 |
| 2014/0268748 | A1 * | 9/2014 | Lay | F21V 23/009 362/362 |
| 2015/0098228 | A1 * | 4/2015 | Simon | F21K 9/60 362/362 |
| 2016/0327252 | A1 * | 11/2016 | Ray | F21V 21/008 |
| 2016/0356460 | A1 * | 12/2016 | Lu | F21V 23/06 |
| 2017/0023186 | A1 * | 1/2017 | Norton | F21K 9/272 |
| 2017/0023221 | A1 * | 1/2017 | Schuh | F21V 31/005 |
| 2017/0105263 | A1 * | 4/2017 | Xiong | H05B 45/46 |
| 2017/0184284 | A1 * | 6/2017 | Van Winkle | F21S 8/061 |
| 2017/0211753 | A1 * | 7/2017 | Jiang | F21K 9/272 |

(Continued)

*Primary Examiner* — Tsion Tumebo
(74) *Attorney, Agent, or Firm* — Winston Hsu

(57) ABSTRACT

A tri-proof lamp with replaceable sensor end cap includes a lamp body, an end cap, a light source board and a sensing module. The end cap is disposed at one end of the lamp body and includes a first portion and a second portion connected to each other. One end of the first portion has a cable outlet. The second portion has a connecting portion and a sensing portion connected to each other and the connecting portion is connected to the other end of the first portion. The light source board is disposed in the lamp body and includes a sensing module connecting port. The sensing module is disposed in the sensing portion and includes a sensing module plug connected to the sensing module connecting port.

10 Claims, 5 Drawing Sheets

(56) References Cited

U.S. PATENT DOCUMENTS

| | | | | |
|---|---|---|---|---|
| 2017/0303353 | A1* | 10/2017 | Guang | H05B 45/375 |
| 2018/0020725 | A1* | 1/2018 | Alarcon | G02B 6/0036 131/329 |
| 2018/0058637 | A1* | 3/2018 | Thiel | F21V 17/16 |
| 2018/0112837 | A1* | 4/2018 | Sadwick | H05B 45/3725 |
| 2018/0306390 | A1* | 10/2018 | Chami | F21S 2/005 |
| 2018/0337517 | A1* | 11/2018 | Hu | H05B 45/395 |
| 2019/0338924 | A1* | 11/2019 | Vang | F21V 23/009 |
| 2020/0196536 | A1* | 6/2020 | Pasini | A01G 9/249 |
| 2021/0199277 | A1* | 7/2021 | Lu | F21V 27/02 |

* cited by examiner

TRI-PROOF LAMP WITH REPLACEABLE SENSOR END CAP

BACKGROUND OF THE INVENTION

1. Field of the Invention

The present invention relates to a tri-proof lamp, in particular to a tri-proof lamp with replaceable sensor end cap.

2. Description of the Prior Art

Generally speaking, as some tough environment applications require tri-proof lamps having water-proof function, dust-proof function and corrosion-proof function. If the tri-proof lamps are used in factories, garages, etc., several tri-proof lights need to be connected to each other in series. Some applications further require tri-proof lamps with sensing functions. As shown in FIG. 1, the currently available tri-proof lamp 1 has a lamp body 11, two end caps 12 and a light source board 13. The power cable CW passes through the outlet of one of the end caps 12 of the tri-proof lamp 1 and enters the outlet of one of the end caps 12 of another tri-proof lamp 1. In this way, the light source boards 13 of the two tri-proof lamps 1 can be connected to each other so as to realize the serial connection of the two tri-proof lamps 1.

Some currently available tri-proof lamps have built-in sensing modules. However, the built-in sensing modules are not detachable, which is not flexible in use. Some currently available tri-proof lamps have the holders for connecting to the external sensing modules. However, the above-mentioned structure requires an additional interface to connect to the sensing module, which not only influences the appearance of the tri-proof lamp, but also is inconvenient to install.

SUMMARY OF THE INVENTION

One embodiment of the present invention, the tri-proof lamp with replaceable sensor end cap includes a lamp body, an end cap, a light source board and a sensing module. The end cap is disposed at one end of the lamp body and includes a first portion and a second portion connected to each other. One end of the first portion has a cable outlet. The second portion has a connecting portion and a sensing portion connected to each other and the connecting portion is connected to the other end of the first portion. The light source board is disposed in the lamp body and includes a sensing module connecting port. The sensing module is disposed in the sensing portion and includes a sensing module plug connected to the sensing module connecting port.

In one embodiment, the tri-proof lamp further includes a power module disposed in the lamp body and connected to the light source module.

In one embodiment, the tri-proof lamp further includes a power cable having a power plug. The power cable penetrates the cable outlet to passes through the first portion and the second portion, whereby the power plug is connected to the power module.

In one embodiment, the power module includes one or more of a filter circuit, a rectifying circuit and a transformer circuit.

In one embodiment, the sensing portion is cylindrical and includes an installation plate and the sensing module is disposed on the inner wall of the installation plate.

In one embodiment, the outer wall of the installation plate has a decorative pattern.

In one embodiment, the decorative pattern is corresponding to the communication protocol of the sensing module.

In one embodiment, the sensing module is an infrared sensing module, a WIFI sensing module, an optical sensing module, a microwave radar sensing module or a Bluetooth sensing module.

In one embodiment, the lamp body includes a housing and a lamp cover.

In one embodiment, the light source board includes a circuit board and a plurality of light sources, and the light sources are light-emitting diodes.

The tri-proof lamp with replaceable sensor end cap in accordance with the embodiments of the present invention may have the following advantages:

(1) In one embodiment of the present invention, the end cap of the tri-proof lamp has a first portion and a second portion connected to each other. One end of the first portion has a cable outlet; the second portion has a connecting portion and a sensing portion connected to each other. A sensor module is disposed in the sensing portion and has a sensing module plug connected to the sensing module port thereof. The above structure can directly integrate the end cap with the sensing module with each other without an addition holder or port, which can make the installation of the sensing module more convenient.

(2) In one embodiment of the present invention, the end cap of the tri-proof lamp can be directly integrated with the sensing module without an additional holder or port in order to provide various sensing functions. Thus, the above structure can achieve the desired technical effects without influencing the appearance of the tri-proof lamp. Therefore, the tri-proof lamps connected in series can be consistent in appearance.

(3) In one embodiment of the present invention, the end cap of the tri-proof lamp can be integrated with the sensor module with a view to providing various sensing functions. In addition, the end cap can still be replaced by a normal end cap, which is more flexible in use and more comprehensive in application.

(4) In one embodiment of the present invention, the end cap of the tri-proof lamp is replaceable, so the user can replace the end cap by another end cap having another sensing module, such as an infrared sensing module, a WIFI sensing module, an optical sensing module, a microwave radar sensing module or a Bluetooth sensing module. Accordingly, the tri-proof lamp can conform to actual requirements.

(5) In one embodiment of the present invention, the design of the tri-proof lamp is simple, which can effectively achieve the desired technical effects without significantly increasing the cost. Thus, the tri-proof lamp can have high commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
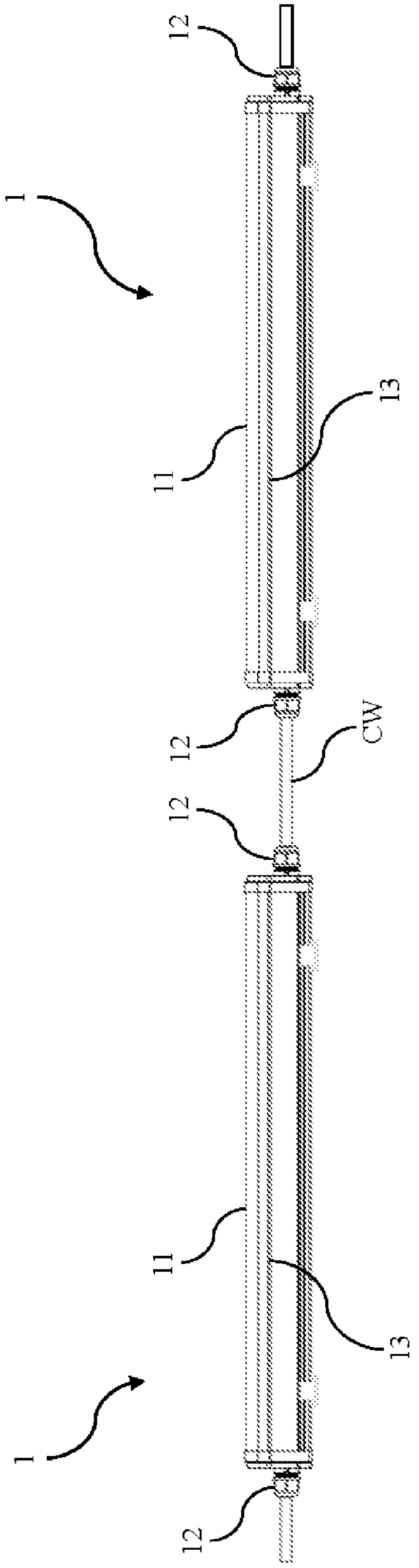
FIG. 1 is a schematic view of a structure of a currently available tri-proof lamp.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
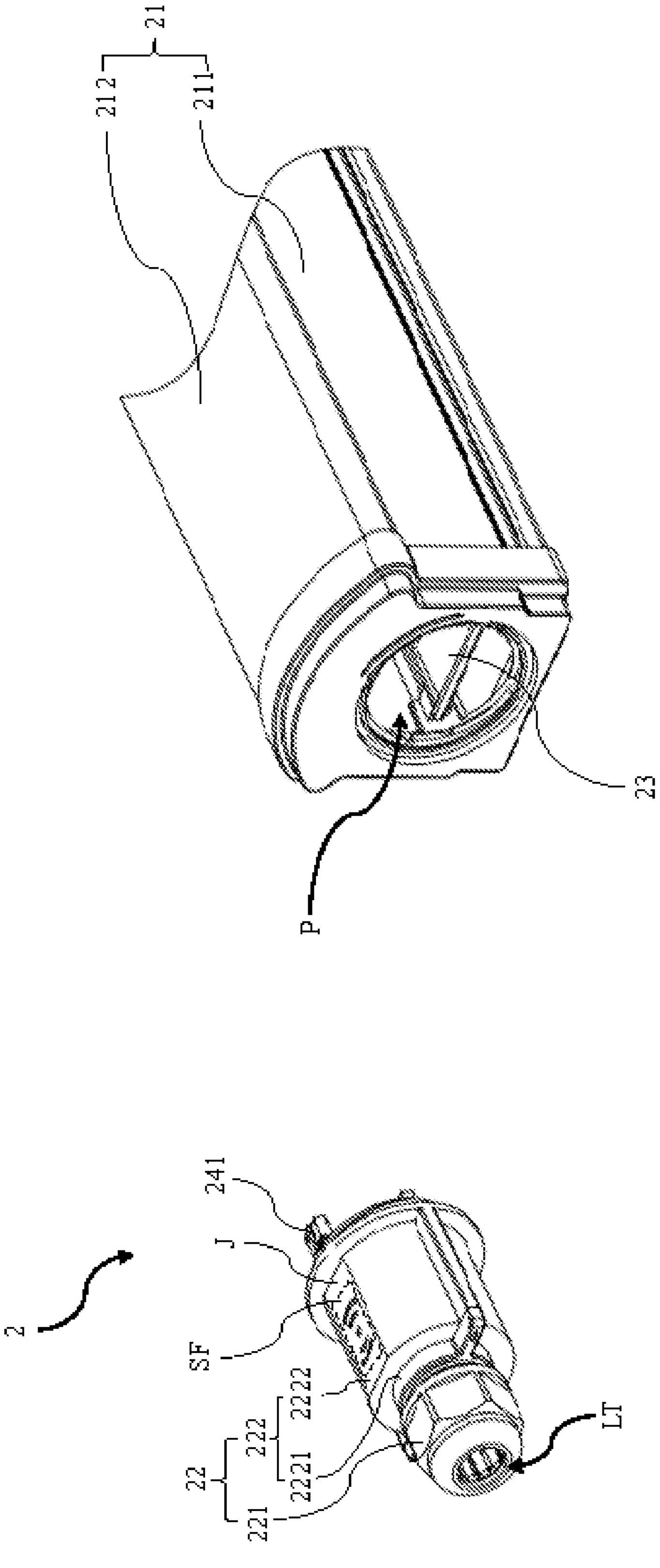
FIG. 2 is a schematic view of the structure of a tri-proof lamp with replaceable sensor end cap in accordance with one embodiment of the present invention.
Figure 3:
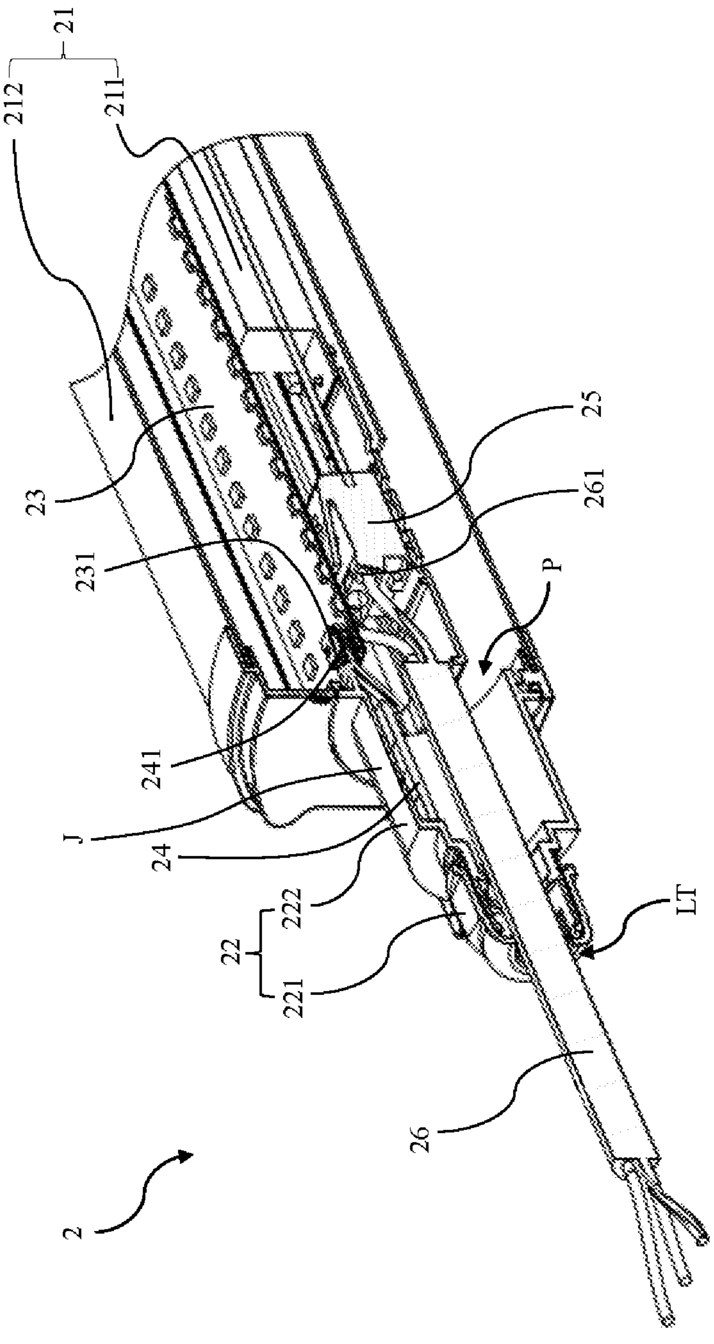
FIG. 3 is a sectional view of the structure of the tri-proof lamp with replaceable sensor end cap in accordance with one embodiment of the present invention.

Please refer to FIG. 2 and FIG. 3. FIG. 2 is a schematic view of a structure of a tri-proof lamp with replaceable sensor end cap in accordance with one embodiment of the present invention. FIG. 3 is a sectional view of the structure of the tri-proof lamp with replaceable sensor end cap in accordance with one embodiment of the present invention. The tri-proof lamp 2 includes a lamp body 21, two end caps 22 (only one of the end caps 22 is shown in the drawings), a light source board 23, a sensing module 24, a power module 25 and a power cable 26.

The lamp body 21 has two openings P (only one of the openings P is shown in the drawings) and includes a housing 211 and a lamp cover 212. The lamp cover 212 is disposed on the housing 211.

The above end caps 22 are disposed at the two ends of the lamp body 21 and cover the openings P respectively. Each of the end caps 22 includes a first portion 221 and a second portion 222. One end of the first portion 221 is provided with a cable outlet LT. The second portion 222 has a connecting portion 2221 and a sensing portion 2222 connected to each other. The connecting portion 2221 is connected to the other end of the first portion 221. The sensing portion 2222 may be cylindrical and may include an installation plate J.

The light source board 23 is disposed in the housing 21 and has a sensing module port 231.

The sensing module 24 is disposed in the sensing portion 2222 and has a sensing module plug 24'. The sensing module plug 24 is connected to the sensing module port 231. The sensing module 24 is disposed on the inner wall of the installation plate J of the sensing portion 2222. The outer wall of the installation plate J is provided with a decorative pattern SF. In another embodiment, the sensing module 24 may be an infrared sensing module, a WIFI sensing module, an optical sensing module, a microwave radar sensing module, a Bluetooth sensing module or other similar components.

The power module 25 is disposed in the housing 21 and connected to the light source board 23. In one embodiment, the power module 25 includes one or more of a filter circuit, a rectifying circuit and a transformer circuit.

The power cable 26 has a power plug 261. The power cable 26 penetrates through the cable outlet LT to pass through the first portion 221 and the second portion 222 of the end cap 22, such that the power plug 261 is connected to the power module 25. Therefore, the power cable 26 and the light source board 23 can be simultaneously disposed in the inner space of the second portion 222. In this way, an external power source (e.g., utility power) can power the power module 25 via the power cable 26, such that the power module 25 can drive the light source board 23.

When the user is installing the tri-proof lamp 2, the user can make the power cable 26 penetrate through the cable outlet LT. Then, the user can insert the sensing module plug 241 of the sensing module 24 into the sensing module port 231 of the light source board 23. Finally, the user can rotate the end cap 22 to fix the end cap 22 with the lamp body 21. The above structure can make the end cap 22 be directly integrated with the sensing module 24 without an additional holder or port, which is convenient in installation and can achieve high installation efficiency. Further, the above structure can also achieve excellent water-proof performance.

Moreover, the end cap 22 of the tri-proof lamp 2 can be directly integrated with the sensing module 24 without an additional holder or port so as to provide various sensing functions. As a result, the tri-proof lamp 2 can achieve the desired technical effects without influencing the appearance thereof, such that the tri-proof lamps 2 connected in series can be consistent in appearance.

Furthermore, the user can replace the end cap 22 by a normal end cap without the sensing module 24. Therefore, the tri-proof lamp 2 can be more flexible in use and more comprehensive in application.

The embodiment just exemplifies the present invention and is not intended to limit the scope of the present invention; any equivalent modification and variation according to the spirit of the present invention is to be also included within the scope of the following claims and their equivalents.

Figure 4:
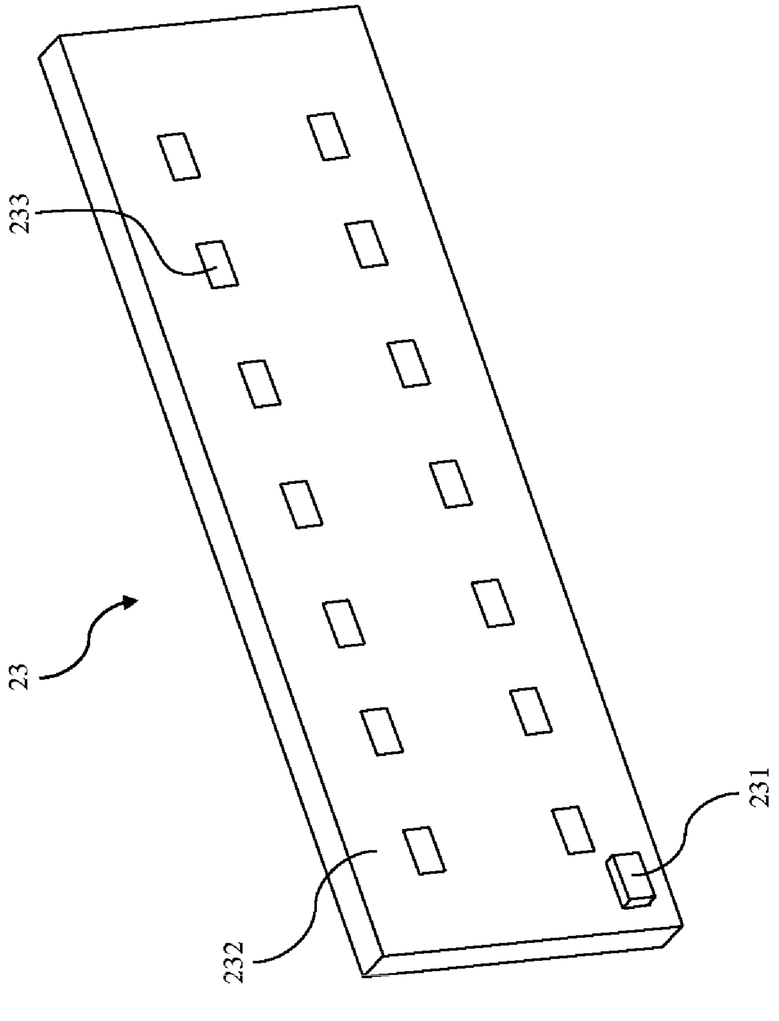
FIG. 4 is a schematic view of a structure of a light source board of the tri-proof lamp with replaceable sensor end cap in accordance with one embodiment of the present invention.

Please refer to FIG. 4, which is a schematic view of a structure of a light source board of the tri-proof lamp with replaceable sensor end cap in accordance with one embodiment of the present invention. As shown in FIG. 4, the light source board 23 includes a sensing module port 231, a circuit board 232 and a plurality of light sources 233. The sensing module port 231 and the above light sources 233 are disposed on the circuit board 232. These light sources 233 may be light-emitting diodes (LED). In another embodiment, these light sources 233 may be other currently available light-emitting elements.

As set forth above, the light sources 233 of the light source board 23 may be LEDs, such that the light-emitting efficiency of the tri-proof lamp 2 can be enhanced. Thus, the power consumption of the tri-proof lamp 2 can be further reduced.

The embodiment just exemplifies the present invention and is not intended to limit the scope of the present invention; any equivalent modification and variation according to the spirit of the present invention is to be also included within the scope of the following claims and their equivalents.

It is worthy to point out that some currently available tri-proof lamps have built-in sensing modules. However, the built-in sensing modules are not detachable, which is not flexible in use. Some currently available tri-proof lamps have the holders for connecting to the external sensing modules. However, the above-mentioned structure requires an additional interface to connect to the sensing module, which not only influences the appearance of the tri-proof lamp, but also is inconvenient to install. On the contrary, according to one embodiment of the present invention, the end cap of the tri-proof lamp has a first portion and a second portion connected to each other. One end of the first portion has a cable outlet; the second portion has a connecting portion and a sensing portion connected to each other. A sensor module is disposed in the sensing portion and has a sensing module plug connected to the sensing module port thereof. The above structure can directly integrate the end cap with the sensing module with each other without an addition holder or port, which can make the installation of the sensing module more convenient.

Also, according to one embodiment of the present invention, the end cap of the tri-proof lamp can be directly integrated with the sensing module without an additional holder or port in order to provide various sensing functions. Thus, the above structure can achieve the desired technical effects without influencing the appearance of the tri-proof lamp. Therefore, the tri-proof lamps connected in series can be consistent in appearance.

Further, according to one embodiment of the present invention, the end cap of the tri-proof lamp can be integrated with the sensor module with a view to providing various sensing functions. In addition, the end cap can still be replaced by a normal end cap, which is more flexible in use and more comprehensive in application.

Moreover, according to one embodiment of the present invention, the end cap of the tri-proof lamp is replaceable, so the user can replace the end cap by another end cap having another sensing module, such as an infrared sensing module, a WIFI sensing module, an optical sensing module, a microwave radar sensing module or a Bluetooth sensing module. Accordingly, the tri-proof lamp can conform to actual requirements.

Furthermore, according to one embodiment of the present invention, the design of the tri-proof lamp is simple, which can effectively achieve the desired technical effects without significantly increasing the cost. Thus, the tri-proof lamp can have high commercial value. As described above, the tri-proof lamp according to the embodiments of the present invention can definitely achieve great technical effects.

Figure 5:
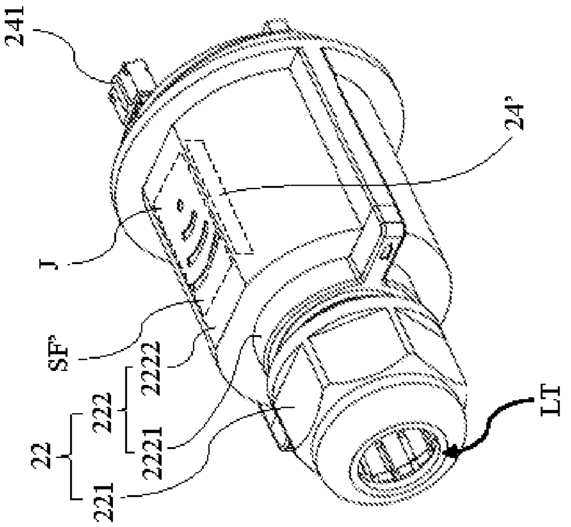
FIG. 5 is a schematic view of a structure of an end cap of a tri-proof lamp with replaceable sensor end cap in accordance with another embodiment of the present invention.

Please refer to FIG. 5, which is a schematic view of a structure of an end cap of a tri-proof lamp with replaceable sensor end cap in accordance with another embodiment of the present invention; please refer to FIG. 2 and FIG. 3. As shown in FIG. 2, FIG. 3 and FIG. 5, the end cap 22 includes a first portion 221 and a second portion 222 connected to each other. One end of the first portion 221 is provided with a cable outlet LT. The second portion 222 has a connecting portion 2221 and a sensing portion 2222 connected to each other. The connecting portion 2221 is connected to the other end of the first portion 221. The sensing portion 2222 is cylindrical and includes the installation plate J.

The above components are similar to those of the previous embodiment, so will not be described therein again. The difference between this embodiment and the previous embodiment is that the end cap 22 of the tri-proof lamp 2 is replaceable. Therefore, the user can replace the end cap 22 by another end cap 22 having another sensing module. In this embodiment, the sensing module 24' of the end cap 22 may be a microwave radar sensing module. Besides, the decorative pattern SF' is corresponding to the communication protocol of the sensing module 24'.

The embodiment just exemplifies the present invention and is not intended to limit the scope of the present invention; any equivalent modification and variation according to the spirit of the present invention is to be also included within the scope of the following claims and their equivalents.

Figure 6:
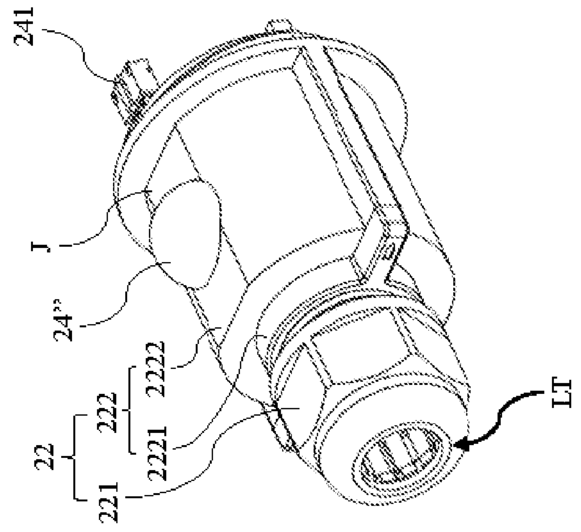
FIG. 6 is a schematic view of a structure of an end cap of a tri-proof lamp with replaceable sensor end cap in accordance with still another embodiment of the present invention.

Please refer to FIG. 6, which is a schematic view of a structure of an end cap of a tri-proof lamp with replaceable sensor end cap in accordance with still another embodiment of the present invention; please refer to FIG. 2 and FIG. 3. As shown in FIG. 2, FIG. 3 and FIG. 6, the end cap 22 includes a first portion 221 and a second portion 222 connected to each other. One end of the first portion 221 is provided with a cable outlet LT. The second portion 222 has a connecting portion 2221 and a sensing portion 2222 connected to each other. The connecting portion 2221 is connected to the other end of the first portion 221. The sensing portion 2222 is cylindrical and includes the installation plate J.

The above components are similar to those of the previous embodiment, so will not be described therein again. The difference between this embodiment and the previous embodiment is that the end cap 22 of the tri-proof lamp 2 is replaceable. Therefore, the user can replace the end cap 22 by another end cap 22 having another sensing module. In this embodiment, the sensing module 24" of the end cap 22 may be an optical sensing module.

As previously stated, the user can replace the end cap 22 by another end cap 22 having another sensing module, such as an infrared sensing module, a WIFI sensing module, an optical sensing module, a microwave radar sensing module, a Bluetooth sensing module or other currently available sensing modules. Accordingly, the tri-proof lamp 2 can meet actual requirements.

The embodiment just exemplifies the present invention and is not intended to limit the scope of the present invention; any equivalent modification and variation according to the spirit of the present invention is to be also included within the scope of the following claims and their equivalents.

According to one embodiment of the present invention, the end cap of the tri-proof lamp has a first portion and a second portion connected to each other. One end of the first portion has a cable outlet; the second portion has a connecting portion and a sensing portion connected to each other. A sensor module is disposed in the sensing portion and has a sensing module plug connected to the sensing module port thereof. The above structure can directly integrate the end cap with the sensing module with each other without an addition holder or port, which can make the installation of the sensing module more convenient.

Also, according to one embodiment of the present invention, the end cap of the tri-proof lamp can be directly integrated with the sensing module without an additional holder or port in order to provide various sensing functions. Thus, the above structure can achieve the desired technical effects without influencing the appearance of the tri-proof lamp. Therefore, the tri-proof lamps connected in series can be consistent in appearance.

Further, according to one embodiment of the present invention, the end cap of the tri-proof lamp can be integrated with the sensor module with a view to providing various sensing functions. In addition, the end cap can still be replaced by a normal end cap, which is more flexible in use and more comprehensive in application.

Moreover, according to one embodiment of the present invention, the end cap of the tri-proof lamp is replaceable, so the user can replace the end cap by another end cap having another sensing module, such as an infrared sensing module, a WIFI sensing module, an optical sensing module, a microwave radar sensing module or a Bluetooth sensing module. Accordingly, the tri-proof lamp can conform to actual requirements.

Furthermore, according to one embodiment of the present invention, the design of the tri-proof lamp is simple, which can effectively achieve the desired technical effects without significantly increasing the cost. Thus, the tri-proof lamp can have high commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tri-proof lamp with replaceable sensor end cap, comprising:

a lamp body;

an end cap, disposed at one end of the lamp body and comprising a first portion and a second portion connected to each other, wherein one end of the first portion has a cable outlet, and the second portion has a connecting portion and a sensing portion connected to each other, and the connecting portion is connected to the other end of the first portion, and the sensing portion comprises an installation plate;

a light source board disposed in the lamp body and comprising a sensing module connecting port; and a sensing module disposed in the sensing portion and comprising a sensing module plug connected to the sensing module connecting port, wherein the sensing module is disposed on an inner wall of the installation plate.

2. The tri-proof lamp with replaceable sensor end cap as claimed in claim 1, further comprising a power module disposed in the lamp body and connected to the light source module.

3. The tri-proof lamp with replaceable sensor end cap as claimed in claim 2, further comprising a power cable having a power plug, wherein the power cable penetrates the cable outlet to passes through the first portion and the second portion, whereby the power plug is connected to the power module.

4. The tri-proof lamp with replaceable sensor end cap as claimed in claim 2, wherein the power module comprises one or more of a filter circuit, a rectifying circuit and a transformer circuit.

5. The tri-proof lamp with replaceable sensor end cap as claimed in claim 1, wherein the sensing portion is cylindrical.

6. The tri-proof lamp with replaceable sensor end cap as claimed in claim 5, wherein an outer wall of the installation plate has a decorative pattern.

7. The tri-proof lamp with replaceable sensor end cap as claimed in claim 6, wherein the decorative pattern is corresponding to a communication protocol of the sensing module.

8. The tri-proof lamp with replaceable sensor end cap as claimed in claim 1, wherein the sensing module is an infrared sensing module, a WIFI sensing module, an optical sensing module, a microwave radar sensing module or a Bluetooth sensing module.

9. The tri-proof lamp with replaceable sensor end cap as claimed in claim 1, wherein the lamp body comprises a housing and a lamp cover.

10. The tri-proof lamp with replaceable sensor end cap as claimed in claim 1, wherein the light source board comprises a circuit board and a plurality of light sources, and the light sources are light-emitting diodes.

* * * * *